United States Patent [19]

Dieterich

[11] 4,194,035

[45] Mar. 18, 1980

[54] MODIFIED POLYISOCYANATES CONTAINING SULFONIC ACID ESTER GROUPS

[75] Inventor: Dieter Dieterich, Leverkusen, Fed. Rep. of Germany

[73] Assignee: Bayer Aktiengesellschaft, Leverkusen, Fed. Rep. of Germany

[21] Appl. No.: 1,814

[22] Filed: Jan. 8, 1979

[30] Foreign Application Priority Data

Jan. 12, 1978 [DE] Fed. Rep. of Germany ....... 2801129

[51] Int. Cl.$^2$ ...................... C08G 18/77; C08G 18/14; C07C 143/68
[52] U.S. Cl. ....................................... 528/67; 252/182; 260/453 AR; 260/456 P; 521/160; 521/162; 521/179; 528/71; 528/73
[58] Field of Search ....................... 521/160, 162, 179; 528/67, 71, 73; 260/456 P

[56] References Cited

U.S. PATENT DOCUMENTS

| | | | |
|---|---|---|---|
| 2,901,497 | 8/1959 | Delfs et al. | 260/456 P |
| 3,535,274 | 10/1970 | Dieterich et al. | 528/71 |
| 3,826,769 | 7/1974 | Carlson | 528/48 |
| 3,988,268 | 10/1976 | Dietrich et al. | 521/162 |
| 3,993,614 | 11/1976 | Carlson | 528/71 |
| 4,119,658 | 10/1978 | Dieterich | 260/29.2 TN |

FOREIGN PATENT DOCUMENTS 2227111 12/1973 Fed. Rep. of Germany.
2359611 6/1975 Fed. Rep. of Germany.
2359615 6/1975 Fed. Rep. of Germany.

*Primary Examiner*—H. S. Cockeram
*Attorney, Agent, or Firm*—Gene Harsh; Joseph C. Gil; R. Brent Olson

[57] ABSTRACT

The instant invention is directed to a process for the preparation of modified polyisocyanates which contain sulfonic acid alkyl ester groups and in which the isocyanate groups may be at least partly in the dimerized form, comprising: reacting isocyanatoaryl sulfonic acids having at least two isocyanate groups and wherein the isocyanate groups may be at least partly in the dimerized form, optionally as mixtures with mono and/or polyisocyanates which are free from sulfonic acid groups, with di- and/or tetrahydrofurans at 0° to 190° C., wherein the equivalent ratio of isocyanate groups, including any isocyanate groups present in the dimerized form, to sulfonic acid groups is greater than 1 and the equivalent ratio of di- and tetrahydrofuran groups to sulfonic acid groups is from 0.1:1 to 10:1.

14 Claims, No Drawings

MODIFIED POLYISOCYANATES CONTAINING SULFONIC ACID ESTER GROUPS

BACKGROUND OF THE INVENTION

Sulfonic acids of aromatic polyisocyanates are known and have been described, for example, in German Offenlegungsschriften No. 2,227,111 and 2,359,615 and U.S. Pat. No. 3,826,769. They are obtained by simply reacting the corresponding aromatic polyisocyanate with a sulfonating agent such as sulfur trioxide, an adduct of sulfur trioxide, oleum, chlorosulfonic acid or sulfuric acid.

The product obtained may be a solid, resinous, or pulverulent sulfonation product or a solution or dispersion of a sulfonated isocyanate in unchanged starting material, depending on the isocyanate used and the degree of sulfonation.

The preparation of polyurethanes or polyurethane ureas based on polyisocyanates containing sulfonic acid groups has been described, for example, in U.S. Pat. No. 3,826,769 and in German Offenlegungsschrift No. 2,359,611. Polyurethanes and polyureas which have been modified in this way with sulfonic acid or sulfonate groups frequently have a very hydrophilic character, and for this reason the proportion of sulfonic acid groups is generally kept as low as possible. Partially sulfonated polyisocyanates and solutions of isocyanatosulfonic acids in polyisocyanates are of special importance for this reason. The main advantage of sulfonated polyisocyanates is due to the high polarity of sulfonic acid groups. This gives rise to marked interactions or forces of adhesion in relation to polar media and substrates such as water, and moist and polar surfaces particularly those of an inorganic nature.

Chemically uniform or persulfonated isocyanatosulfonic acids, on the other hand, have high melting points and a low degree of solubility in organic media. Also, they are extremely sensitive to water and atmospheric moisture. These characteristics make the products difficult to process. The highly acid character is also frequently a disadvantage. Discoloration and premature degradation of polyurethanes produced from these substances make the products difficult to use in practice. Although these phenomena can be prevented by suitable neutralization methods, these increase the hydrophilic character of the products.

There is therefore a demand for polyisocyanates which would have a polar character (with its attendant advantages such as a low vapor pressure and improved adhesiveness) and would, at the same time, be predominantly hydrophobic.

There is also a demand for readily available aromatic polyisocyanates from which could be synthesized oligomers and polymers which give rise to toxicologically harmless products on hydrolytic degradation.

DESCRIPTION OF THE INVENTION

The present invention relates to a solution to these problems. It has surprisingly been found that when aromatic polyisocyanatosulfonic acids are reacted with di- or tetrahydrofurans under conditions in which there is an increase in molecular weight, the products obtained are novel aromatic polyisocyanates which are characterized by the presence of sulfonic acid ester groups.

The new polyisocyanates according to the present invention have numerous advantageous properties compared with known polyisocyanates:

1. They have a highly polar character, exceptionally low vapor pressure and excellent compatibility with numerous polar and apolar media and reactants.
2. The hydrophilic character of the products can be controlled within wide limits by the chemical nature and quantity of the di- or tetrahydrofuran used. Hydrophobic polyisocyanates are obtained when the sulfonic acid groups are completely reacted with di- or tetrahydrofurans.
3. The hydrolytic degradation of the products leads to toxicologically harmless polyamino sulfonic acids.
4. The functionality of the polyisocyanates according to the invention can be increased by the reaction. In particular, relatively highly functional polyisocyanates having a low vapor pressure can be obtained from bifunctional isocyanates by the process according to the invention.
5. Use of the polyisocyanates according to the invention, for example in the preparation of polyurethanes, results in polymers with improved fire characteristics.

It has surprisingly been found that di- and tetrahydrofurans behave at least partially as bi-functional compounds when they react with isocyanatosulfonic acids. It is assumed that the di- or tetrahydrofuran ring is initially opened by the sulfonic acid group in a rapid reaction, giving rise to a hydroxyl group which in turn reacts more slowly with an isocyanate group. The reaction therefore not only results in a modification of the sulfonic acid group to a hydrophobic sulfonic acid ester group but also leads to a chain lengthening or chain linking by an aryl sulfonic acid amide alkyl ester group. It is only when sterically hindered cyclic ethers such as 2,2,5,5-tetramethyltetrahydrofuran are used, that it may be assumed that the reaction stops at the stage of a hydroxy alkyl ester.

The present invention thus relates to a process for the preparation of modified polyisocyanates which contain sulfonic acid alkyl ester groups and in which the isocyanate groups may be at least partly in the dimerized form, comprising reacting isocyanatoaryl sulfonic acids having at least two isocyanate groups and wherein the isocyanate groups may be at least partly in the dimerized form, with di- and/or tetrahydrofurans at temperatures from 0° to 190° C., optionally as mixtures with mono and/or polyisocyanates which are free from sulfonic acid groups, wherein the equivalent ratio of isocyanate groups, including any isocyanate groups present in the dimerized form, to sulfonic acid groups is greater than 1 and the equivalent ratio of di- and tetrahydrofuran groups to the sulfonic acid groups is from 0.1:1 to 10:1.

The present invention also relates to the preferred modified polyisocyanates obtainable by the process according to the invention, containing:

(a) 4 to 48%, preferably 10 to 40%, by weight of isocyanate groups, optionally at least in the dimerized form, (b) 0.3 to 38%, preferably 0.6 to 28%, by weight of groups of the formula SO₂—O— forming part of an aryl sulfonic acid alkyl ester group, (c) 0 to 36%, preferably 0 to 10%, by weight of sulfonic acid groups, (d) 0 to 25%, preferably 0.2 to 20%, by weight of urethane groups —NH—CO—O and (e) 0 to 28%, preferably 0.2 to 20%, by weight of allophanate groups

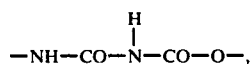

wherein the groups mentioned under (d) and (e) together amount to at least 0.4% by weight and no more than 28% by weight and the groups mentioned under (b) and (c) together amount to no more than 38% by weight.

Finally, the present invention relates to the use of the modified polyisocyanates obtainable by the process according to the invention as starting materials for the preparation of oligomeric or polymeric polyaddition products.

When carrying out the process of the invention, addition of the di- or tetrahydrofuran to the sulfonic acid group of the aromatic isocyanatosulfonic acid with formation of isocyanato-aryl sulfonic acid hydroxyalkyl esters takes place in a first reaction step. Thus, for example, diisocyanatobenzene sulfonic acid (I) reacts with tetrahydrofuran (II) in the first reaction stage of the process of the invention to form the corresponding diisocyanatobenzene sulfonic acid hydroxyalkyl ester (III):

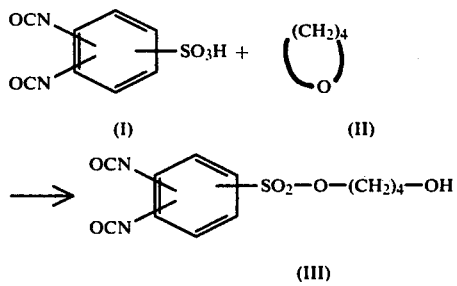

When less than equivalent quantities of di- or tetrahydrofurans are used, mixtures also containing unreacted isocyanatoaryl sulfonic acids are formed in the first reaction stage of the process according to the invention.

If the hydroxyl group formed in the first stage of the reaction is not prevented, for example by steric hindrance, from undergoing further reaction, the second reaction stage of the process according to the invention gives rise to compounds containing excess isocyanate groups, sulfonic acid alkyl ester groups and urethane groups. Thus, for example, the intermediate product (III) indicated above may undergo a chain lengthening reaction with itself to form higher molecular weight compounds corresponding to the following formula (IV):

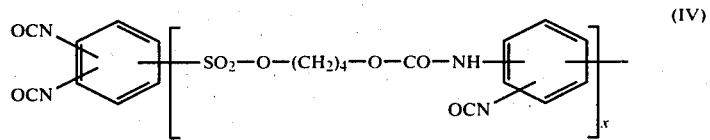

wherein x=0 to 20.

Any isocyanates present in the reaction mixture which are free from hydroxyl groups, which may be either isocyanatoaryl sulfonic acids which have not hitherto taken part in the reaction or any mono or polyisocyanates present in the reaction mixture which are free from sulfonic acid groups, may cause chain breaking to form end groups corresponding to the following formula (V)

wherein R represents the group obtained by removal of an isocyanate group from a mono or polyisocyanate which is free from hydroxyl groups.

It will readily be seen that the size of the number x in formula IV depends on the nature and proportions of the starting materials used. Thus, when polyisocyanatoaryl sulfonic acids are used as the only isocyanate component, the second stage of the process according to the invention carried out with equivalent or excess quantities of di- or tetrahydrofurans gives rise to comparatively high molecular weight compounds, whereas subequivalent quantities of di- or tetrahydrofurans and/or the addition of mono or polyisocyanates which are free from sulfonic acid groups give rise to comparatively low molecular weight compounds in which x may even be zero.

Depending on the reactivity of the isocyanates used as starting materials and on the reaction conditions employed, in particular the reaction temperature, a third reaction stage may take place in the process according to the invention, in which derivatives containing allophanate groups may be formed by the addition of isocyanate groups to the urethane groups. According to another embodiment of the process of the invention, comparatively highly functional di- or tetrahydrofurans may be used, i.e. compounds which have more than one di- or tetrahydrofuran group. In that case, branched products are obtained in accordance with the scheme of formulae exemplified above since, for example, 2 mol of a monosulfonic acid would react with 1 mol of a bis-(tetrahydrofuran) in the first reaction stage to form a derivative containing 2-hydroxyalkyl groups, and this derivative would then continue to react as already described above to form relatively highly branched derivatives. From what has been said so far, it will be clear that, in carrying out the process according to the invention, the molecular size and degree of branching and hence the viscosity and isocyanate functionality of the products obtained by the process according to the invention can easily be adjusted by suitable choice of the starting materials and their proportions and the reaction conditions, i.e. in particular the reaction temperature (allophanate formation). This assertion is justified particularly in view of the fact that instead of the starting materials exemplified above, there may be used any starting materials mentioned by way of example below, i.e. in particular isocyanatoaryl sulfonic acids, di- or tetrahydrofuran and mono- or polyisocyanates which are free from sulfonic acid groups.

The process according to the invention thus preferably gives rise to modified polyisocyanates which, in addition to isocyanate groups and sulfonic acid alkyl ester groups, may contain free sulfonic acid groups and may contain urethane and/or allophanate groups. It is only when sterically hindered di- or tetrahydrofurans are used that the process of the invention results in modified polyisocyanates which do not contain urethane or allophanate groups. Since the isocyanatoaryl sulfonic acids used as starting materials are frequently present at least partly in a dimerized form (uretdiones), polyisocyanates which have been modified according to the invention frequently also have their isocyanate groups at least partly in the dimerized form.

The preferred modified polyisocyanates obtainable by the process according to the invention comprise:

(a) 4 to 48% by weight, preferably from 10 to 40% by weight, of isocyanate groups, optionally in the dimerized form;
(b) 0.3 to 38% by weight, preferably from 0.6 to 28% by weight, of —$SO_2$—O— groups forming part of an aryl sulfonic acid alkyl ester group;
(c) 0 to 36% by weight, preferably from 0 to 10% by weight, of sulfonic acid groups;
(d) 0 to 25% by weight, preferably from 0.2 to 20% by weight, of urethane groups —NH—CO—O—; and
(e) 0 to 28% by weight, preferably from 0.2 to 20% by weight, of allophanate groups —NH—CO—NH—CO—O—;

the total quantity of groups mentioned under (d) and (e) amounting to at least 0.4% by weight and no more than 28% by weight and the total quantity of groups mentioned under (b) and (c) amounting to no more than 38% by weight.

The isocyanatoaryl sulfonic acids used in the process according to the invention may be sulfonation products of any known aromatic polyisocyanates. The following are examples of such aromatic polyisocyanates used in the form of their sulfonation products in the process according to the invention:

4,4'-stilbene diisocyanate; 4,4'-dibenzyl diisocyanate; 3,3'- and 2,2'-dimethyl-4,4'-diisocyanato-diphenyl methane; 2,5,2'5'-tetramethyl-4,4'-diisocyanato-diphenyl methane; 3,3'-dimethoxy-4,4'-diisocyanato-diphenyl methane; 3,3'-dichloro-4,4'-diisocyanato-diphenyl methane; 4,4'-diisocyanato-diphenyl-cyclohexyl methane; 4,4'-diisocyanatobenzophenone; 4,4'-diisocyanato-diphenyl sulfone; 4,4'-diisocyanato-diphenyl ether; 4,4'-diisocyanato-3,3'-dibromo-diphenyl methane; 4,4'-diisocyanato-3,3'-diethyl-diphenyl methane; 4,4'-diisocyanato-diphenyl-ethylene-(1,2); 4,4'-diisocyanato-diphenyl-sulfide; 1,3- and 1,4-phenylene diisocyanate; 2,4- and 2,6-tolylene diisocyanate and any mixtures of these isomers; diphenyl methane-2,4'- and/or -4,4'-diisocyanate; naphthylene-1,5-diisocyanate; triphenyl methane-4,4',4''-triisocyanate; polyphenyl-polymethylene polyisocyanates such as may be obtained by aniline-formaldehyde condensation followed by phosgenation, as described e.g. in British Pat. Nos. 874,430 and 848,671; polyisocyanates containing carbodiimide groups as described in German Pat. No. 1,092,007; diisocyanates as described in U.S. Pat. No. 3,492,330; polyisocyanates containing allophanate groups as described e.g. in British Pat. No. 994,890, Belgian Pat. No. 761,626 and published Dutch Patent Application No. 7,102,524; polyisocyanates containing isocyanurate groups as described e.g. in German Pat. Nos. 1,022,789; 1,222,067 and 1,027,394 and in German Offenlegungsschriften Nos. 1,929,034 and 2,004,048; polyisocyanates containing acylated urea groups according to German Pat. No. 1,230,778; and polyisocyanates containing biuret groups as described e.g. in German Pat. No. 1,101,394, British Pat. No. 889,050 and French Pat. No. 7,017,514. The distillation residues obtained from the commercial production of isocyanates and still containing isocyanate groups may also be used, optionally dissolved in one or more of the polyisocyanates mentioned above. Any mixtures of the above-mentioned polyisocyanates may also be used.

Phosgenation products of condensates of aniline and aldehydes or ketones such as acetaldehyde, propionaldehyde, butyraldehyde, acetone or methylethyl ketone may also be used.

The phosgenation products of condensates of anilines which are alkyl substituted on the nucleus are also suitable, in particular condensates of toluidines with aldehydes or ketones such as formaldehyde, acetaldehyde, butyraldehyde, acetone or methylethyl ketone.

Reaction products of the above-mentioned aromatic polyisocyanate mixtures with from 0.2 to 50 mol percent of polyols are also suitable, provided that the viscosity of the resulting reaction products does not exceed 50,000 cP at 25° C. and the isocyanate content of the reaction products is at least 6% by weight. Suitable polyols for the modification of the starting materials include, in particular, the polyether polyols and/or polyester polyols well known in polyurethane chemistry which have molecular weights in the range of from 200 to 6,000, preferably from 300 to 4,000, and low molecular weight polyols with molecular weights in the range of from 62 to 200. Examples of such low molecular weight polyols include ethylene glycol, propylene glycol, glycerol, trimethylol propane and 1,4,6-hexanetriol.

Particularly preferred isocyanatoaryl sulfonic acids are the sulfonation products of 2,4-tolylene diisocyanate and of mixtures of 2,4- and 2,6-tolylene diisocyanate as well as sulfonation products of polyisocyanates obtained by the phosgenation of aniline/formaldehyde condensates. These mixtures contain, in particular, 4,4'-diisocyanato-diphenyl methane and 2,4'-diisocyanato-diphenyl methane as well as higher nuclear homologues of these products. It is in principle immaterial what sulfonating agents have been used to prepare the isocyanatoaryl sulfonic acids. Suitable sulfonating agents are, for example, sulfur trioxide, oleum, sulfuric acid, and complexes of sulfur trioxide with Lewis bases which contain oxygen, nitrogen or phosphorus atoms. However, any other sulfonating agents, such as chlorosulfonic acid and acyl sulfates may also be used, for example acetyl sulfate or reaction products of acid anhydrides with sulfuric acid or oleum. Side reactions such as the formation of urea or biuret or the partial conversion of isocyanate groups into carbamic acid chloride groups or acylamide groups are generally of no significance. This is especially true for the preparation of only partially sulfonated isocyanates, so that compounds such as sulfuric acid, chlorosulfonic acid or acetyl sulfate may well be used in such cases. For the preparation of highly sulfonated polyisocyanates, on the other hand, it is preferred to use sulfur trioxide or its complexes, according to German Offenlegungsschrift No. 2,510,693. It follows that it is also preferred to use, in particular, aromatic polyisocyanatoaryl sulfonic acids based on tolylene diisocyanate or diphenyl methane diisocyanate which contain urea or biuret groups.

Solutions and dispersions of isocyanatoaryl sulfonic acids in unsulfonated liquid polyisocyanates are particularly preferred. Such products are obtained, for example, from the partial sulfonation of aromatic polyisocyanates. The partial sulfonation of chemically uniform diisocyanates or of binary isomeric mixtures generally gives rise to suspensions, whereas the partial sulfonation of multi-component mixtures gives rise to homogeneous solutions. According to the invention, it is immaterial whether solutions or suspensions are used in the process. Partially sulfonated polyisocyanate mixtures such as are obtained by the phosgenation of aniline-formaldehyde condensates and which have been described in German Offenlegungsschriften Nos. 2,227,111; 2,359,614 and 2,359,615 are particularly preferred. Suspensions of diisocyanatotoluene-sulfonic acid dimers and of diisocyanato-diphenyl methane-sulfonic acid dimers in diisocyanatotoluene or diisocyanato-diphenyl methane are also particularly preferred.

The preparation of the isocyanatoaryl sulfonic acids used in the process of the invention and of the mixtures of these acids with unsulfonated aromatic polyisocyanates is carried out by methods known in the art or by analogous methods. Examples are those based on the publications already mentioned above or U.S. Pat. No. 3,286,769. The processes described in U.S. patent applications Ser. Nos. 848,969 or 782,642 are also suitable for the preparation of isocyanatoaryl sulfonic acids which may be used in the process of the invention.

Solutions or suspensions of the isocyanatoaryl sulfonic acids exemplified above in aliphatic polyisocyanates, such as tetramethylene diisocyanate or hexamethylene diisocyanate; and/or in cycloaliphatic or mixed aliphatic-cycloaliphatic polyisocyanates, such as 4,4'-diisocyanatodicyclohexyl methane, 2,4- or 2,6-diisocyanato-hexahydrotoluene or 1-isocyanato-3,3,5-trimethyl-5-isocyanatomethylcyclohexane may also be used for the process. Where it is desired to lower the isocyanate functionality of the products obtained according to the invention, solutions or suspensions of isocyanatoaryl sulfonic acids in aromatic, aliphatic or cycloaliphatic monoisocyanates may also be used. Examples of the last mentioned compounds include phenyl isocyanate; tosyl isocyanate, n-hexyl isocyanate; 6-chlorohexyl isocyanate; cyclohexyl isocyanate and methoxymethyl isocyanate. Sulfonated aromatic monoisocyanates such as phenyl isocyanate could also be used as isocyanatoaryl sulfonic acid in combination with unsulfonated polyisocyanates of the type exemplified above. The nature and proportions of the isocyanates used in the process according to the invention and degree of sulfonation are chosen so that the equivalent ratio of isocyanate groups present, optionally partly in the dimerized form, to sulfonic acid groups is greater than 1:1, i.e. in particular from 1.05:1 to 50:1, preferably from 2:1 to 30:1.

The furans used as reactants for the isocyanatoaryl sulfonic acids in the process of the invention may be any di- and/or tetrahydrofurans, in particular tetrahydrofuran itself, mono- and di-$C_1$–$C_4$-alkyl-tetrahydrofuran, tetrahydrofurfuryl alcohol and 2,5-dihydrofuran. Unsubstituted tetrahydrofuran is particularly suitable.

Among the suitable or particularly suitable furan derivatives may be included, for example, 2-methyl-tetrahydrofuran; 2,5-dimethyl-tetrahydrofuran; 3,3-dimethyl-tetrahydrofuran; 3,4-dimethyl-tetrahydrofuran; 2-phenyl-tetrahydrofuran; 3,4-diphenyl-tetrahydrofuran; 2,3-dichloro-tetrahydrofuran; tetrahydrofurfuryl alcohol and its $C_1$–$C_6$-alkyl ethers and its esters, e.g. with acetic acid, butyric acid, acrylic acid, methacrylic acid or benzoic acid; 2,2,5,5-tetramethyl-tetrahydrofuran; 2-methyl-2-isopropenyl-tetrahydrofuran; 2-ethyl-2-vinyl-tetrahydrofuran; 2,2,5,5-bis-(pentamethylene)-tetrahydrofuran; 2,5-dimethyl-2-hydroxymethyl-tetrahydrofuran; 5-methyl-2-bromomethyl-tetrahydrofuran; 2,5-bis-(hydroxymethyl)-tetrahydrofuran; 2,5-bis-(chloromethyl)-tetrahydrofuran; 2,2-dimethyl-5-bromotetrahydrofuran; 7-oxa-spiro-[4,4]-decane; 2,5-dihydrofuran; 2,5-dimethyl-2,5-dihydrofuran; 7-oxa-dispiro-[5,1,5,2]-pentadecane-(1,4); 2,2,5,5-tetramethyl-2,5-dihydrofuran; 4,5-dihydrofuran; 4-methyl-4,5-dihydrofuran and 2-methyl-4,5-dihydrofuran.

The di- and tetrahydrofurans used in the process of the invention and quantities in which they are used are chosen so that the equivalent ratio of di- or tetrahydrofuran groups to sulfonic acid groups is from 0.1:1 to 10:1, preferably from 0.6:1 to 5:1. A greater excess of di- or tetrahydrofuran could, of course, be used. The excess then would have the function of a solvent which can be removed by distillation after the reaction. Even when equivalent or excess quantities of di- or tetrahydrofurans are used, only partial esterification is generally achieved owing to the relative inertia of the furan ring which is in itself stable. However, this partial esterification is sufficient, for example, to dissolve solid, high melting isocyanatosulfonic acids or convert them into liquid homogeneous polyisocyanates. Complete esterification of the sulfonic acid groups present is generally only achieved if a molar excess of furan derivatives is present and if elevated temperatures are employed.

The process according to the invention is generally carried out within the temperature range of from 0° to 190° C., preferably from 20° to 140° C. If complete esterification is desired, it is advisable to use a reaction temperature of from 50° to 140° C., preferably for a period of from 1 to 12 hours. The reaction time may otherwise vary within wide limits and may even extend over several days.

If the process is carried out batchwise, the polyisocyanate is preferably introduced into a stirrer vessel at room temperature and the di- or tetrahydrofuran is stirred into it. If the proportion of sulfonic acid groups in the polyisocyanate is more than about 10%, it may be advisable to carry out the reaction at lower temperatures, e.g. at 0° to 20° C., if necessary with cooling. However, this measure is generally unnecessary since there is no harm in the reaction mixture being heated to, for example, 140° C. or higher.

The reaction is preferably carried out without solvent. However, inert solvents such as dichloroethane, chloroform, tetrachloroethane, trichlorofluoro methane, acetone, toluene or chlorobenzene may be employed.

The reaction of solid polyisocyanatosulfonic acids with di- or tetrahydrofurans causes no problems, since the solid sulfonic acids rapidly go into solution during the reaction. The products obtained from the process are therefore generally homogeneous liquids or highly viscous to solid resins. If the reaction with the epoxide is only partial, the products may also be obtained in the form of dispersions still containing solid isocyanatosulfonic acid.

According to a preferred embodiment of the invention, solutions of the isocyanatosulfonic acids in organic phosphates are used for the reaction with di- or tetrahydrofuran. Organic phosphites, phosphonates or pyrophosphates may also be used instead of phosphates. Sulfonation is preferably already carried out in the presence of the phosphates and the reaction according to the invention is carried out immediately thereafter. If acid organic phosphates are used, or if transesterification reactions between isocyanatosulfonic acid and phosphate occur after sulfonation, the hydroxyl group of the phosphate is liable to react with the di- or tetrahydrofuran. This must be taken into account when calculating the proportions of starting materials to be used.

Suitable phosphates, phosphites, phosphonates and pyrophosphates have been mentioned, for example, in German Offenlegungsschrift No. 2,510,693. Tris-(2-chloroethyl)-phosphate is particularly preferred.

The reaction of isocyanatosulfonic acids with di- or tetrahydrofurans is most preferably carried out immediately after the sulfonation reaction. This method has the special advantage that it obviates the need for isolation of the free isocyanatoaryl sulfonic acids, which are extremely sensitive to moisture. According to one particularly preferred embodiment, the polyisocyanate, e.g. tolylene diisocyanate or diisocyanatodiphenyl methane, is sulfonated in a solvent such as chlorobenzene and the resulting suspension is reacted with a di- or tetrahydrofuran. Since the phosgenation reaction for preparing the polyisocyanate is normally also carried out in an inert solvent such as chlorobenzene, the process of phosgenation, sulfonation and esterification may be carried out directly one after the other without isolation of the intermediate stages. The products are, in this way, obtained directly from the corresponding diamine as solutions or dispersions in the solvent used.

If less than about 50% of the polyisocyanate is to be sulfonated and esterified, the process may be carried out in the absence of organic solvents. Sulfonation in that case results in a suspension of the sulfonated polyisocyanate in unchanged starting isocyanate. The suspended solid phase generally goes into solution during the reaction with the di- or tetrahydrofuran and a solution of the sulfonic acid ester in the starting isocyanate is obtained. Due to the high proportion of isocyanate groups to SO$_3$H groups, the molecular weight of the isocyanatoaryl sulfonic acid ester is, in this case, lower than in the case of complete sulfonation of the polyisocyanate.

The solvent free method may be used, for example, for preparing viscous solutions of tolylene diisocyanate which is modified with sulfonic acid ester groups. These solutions may be used as such, instead of unmodified tolylene diisocyanate, or the free diisocyanate may be distilled off and the resinous sulfonic acid ester isocyanate isolated. This resinous product may be used as such, for example in lacquer powders, or it may be dissolved in solvents or in any polyisocyanates, including aliphatic polyisocyanates. When crude phosgenation products of aniline-formaldehyde condensates are used as polyisocyanates, the solvent free method is to be recommended only if less than about 30%, in particular from 5 to 20%, of the polyisocyanate is sulfonated and reacted with di- or tetrahydrofuran because both sulfonation and esterification, which is generally followed by urethanization, are accompanied by a considerable increase in viscosity.

If a higher degree of sulfonation is desired, it is again advisable to use an inert solvent or to carry out sulfonation immediately after phosgenation, before the solvent used for phosgenation is distilled off.

When the isocyanatoaryl sulfonic acids are to be reacted with di- or tetrahydrofurans, it should be borne in mind that the first reaction step, which consists of ring opening of the heterocyclic compound accompanied by esterification, takes place rather rapidly. The second reaction step, consisting of the reaction of the resulting hydroxyl group with the isocyanate groups present, proceeds more slowly. As a result, the viscosity rises only slowly and elevated temperatures and/or catalysts, e.g. organometallic compounds such as tin dioctoate or dibutyl tin dilaurate, may be used to accelerate the second step of the reaction.

As already mentioned above, the process according to the invention generally gives rise to the formation of modified polyisocyanates which contain free isocyanate groups and urethane groups which are capable of reacting further to form the corresponding compounds containing allophanate groups. In the absence of any catalysts which accelerate such allophanate formation, however, this secondary reaction (third stage of the process according to the invention) can only be observed to a very minor extent if at all, unless the products formed in the process according to the invention are subjected to prolonged heating at elevated temperatures, for example above 100° C. However, allophanate formation may be desirable for increasing the isocyanate functionality. In such a case, it is advisable to use catalysts which accelerate the formation of allophanate from urethane groups and isocyanate groups, for example, the catalysts described in German Offenlegungsschrift No. 2,040,645 or in U.S. Pat. No. 3,769,318. A typical example of such a catalyst is zinc acetyl acetonate.

The products obtained by the process according to the invention are valuable starting materials for the production of polyurethane resins by the isocyanate polyaddition process. They are suitable, for example, for the manufacture of cellular and non-cellular elastomers, flexible foams, semi-rigid foams and rigid foams, especially where high standards of cross-linking density, fire characteristics or degradability are demanded. The polyisocyanates according to the invention are therefore suitable, for example, for the manufacture of upholstery materials, mattresses, elastic underlays, car seats, damping materials, shock absorbers, constructional materials, sound insulations and moisture absorbent materials. They may also be used in the surgical field and in the preparation of substrates for plant cultivation, and for protection against heat and cold. The polyisocyanates according to the invention are particularly suitable for the manufacture of inorganc-organic synthetic materials, for example by processes similar to those described in German Pat. No. 2,310,559 and German Offenlegungsschriften Nos. 2,227,147 and 2,359,608 and for the manufacture of surface coatings, impregnations and adhesives. Aqueous emulsions may be prepared by dispersion of the polyisocyanates according to the invention in water, optionally in the presence of bases.

EXAMPLES

The following isocyanatoaryl sulfonic acids were used in Examples 1 through 8, all percentages given are percentages by weight:

Sulfonated Polyisocyanate I 1914 g (11 mol) of tolylene diisocyanate (isomeric mixture 2,4:2,6=80:20) are reacted with 335 g (4.2 mol) of sulfur trioxide at from 23° to 30° C. for about 20 hours with stirring, a thick liquid suspension of dimeric tolylene diisocyanate monosulfonic acid in tolylene diisocyanate being obtained. Sulfur trioxide is liberated from heated 65% oleum by means of a slow stream of nitrogen and conducted as a gas diluted with nitrogen over the surface of the stirred isocyanate. The resulting suspension is diluted with 500 ml of toluene and suction filtered and the solid residue is suspended twice with 500 ml of toluene and suction filtered. The product, still moist with toluene, is filled into containers. Yield: 1285 g, toluene content 23%, weight of dry substance 990 g, corresponding to 93% of the theoretical yield.

The product is a slightly moist powder which may easily be handled without causing dust. It may easily be poured into containers or from one container to another, does not cake together and does not stick to a spatula. The uretdione of diisocyanatotoluenesulfonic acid prepared is used in a concentration of 76% in the form of the moist powder with toluene.

Sulfonated Polyisocyanate II 2000 g of diisocyanatodiphenylmethane (isomeric mixture 2,4:4,4=60:40) are gassed with a stream of sulfur trioxide/nitrogen at room temperature until about 73 g of sulfur trioxide is absorbed. The product has a viscosity of 120 cP at 25° C., a sulfur content of 1.25% and an isocyanate content of 30.1%, acid content 32.2 milliequivalents per 100 g.

Sulfonated Polyisocyanate III

The dinuclear component of a crude phosgenation product of an aniline/formaldehyde condensate is distilled off until the distillation residue has a viscosity of 400 cP at 25° C. The resulting product is sulfonated to a sulfur content of 0.96% by passing a stream of sulfur trioxide/nitrogen mixture through it with stirring. After about 8 months, the viscosity is 5000 cP at 25° C. Isocyanate content 29.2%, acid content 31.5 milliequivalents per 100 g.

Example 1

14.2 g (0.2 mol) of tetrahydrofuran are stirred into 500 g (about 2 mol) of the sulfonated polyisocyanate II at 25° C. After 4 days, the viscosity is 95 cP, after 24 days, 100 cP, isocyanate content 28.4%, acid content 14.7 milliequivalents per 100 g. Viscosity after 2 months: 130 cP/25° C.

Example 2

15.6 g of tetrahydrofuran are stirred into 600 g of the sulfonated polyisocyanate III. After 4 days, the viscosity is 3300 cP, after 24 days, 3500 cP/25° C.; isocyanate content 28.5%, acid content 21.9 milliequivalents per 100 g.

Example 3

500 g of the product obtained according to Example 2 are maintained at 100° C. for 2½ hours and the product is then cooled. The following data are then measured: Viscosity 4200 cP/25° C., isocyanate content 27.8%, acid content 17.8 milliequivalents per 100 g. The reduction in the acid content compared with that of the starting material is an indication of the reactivity with tetrahydrofuran. The true acid value of the tetrahydrofuran reaction products are presumably even lower. It must be taken into account that when the acid value is being determined, some of the sulfonic acid ester groups are decomposed by hydrolysis.

Example 4

65.9 g of the sulfonated polyisocyanate I (corresponding to 50 g of dry substance) are mixed with 100 g of tolylene diisocyanate (isomeric mixture 2,4:2,6=80:20) and 16.5 g of tetrahydrofuran (120%, based on the sulfonic acid groups). The suspension is heated to 70° C. and maintained at this temperature for 2 hours. The temperature is then slowly raised to 100° C. over a period of 6 hours, during which time the sulfonic acid slowly goes into solution. The reaction product is filtered through a close meshed metal sieve at room temperature (0.4 g residue) and any toluene still present is distilled off under vacuum. The reaction product is a thick, slightly cloudy liquid, and no solid precipitates even after prolonged storage. Isocyanate content: 36.3%, acid content 22 milliequivalents per 100 g. The product is hydrophobic and immiscible with cold water.

Example 5

The procedure is the same as in Example 4 but using 131.8 g of the sulfonated polyisocyanate I (corresponding to 100 g of dry substance), 100 g of tolylene diisocyanate and 33 g of tetrahydrofuran. The reaction product is distinctly more viscous than that obtained in Example 4 but does not form a solid precipitate even after prolonged storage. Isocyanate content: 30.1%, acid content 34.9 milliequivalents per 100 g.

Example 6

The procedure is the same as in Example 4 but using 131.8 g of sulfonated polyisocyanate I (corresponding to 100 g of dry substance), 50 g of tolylene diisocyanate and 33 g of tetrahydrofuran. The reaction product obtained is highly viscous at 60° C. and can no longer flow when cooled to room temperature. Isocyanate content: 28.1%, acid content 52.8 milliequivalents per 100 g.

Example 7

65.9 g of sulfonated polyisocyanate I (corresponding to 50 g of dry substance) are dissolved in 140 ml of tetrahydrofuran at room temperature. The mixture is then boiled under reflux at 70° C. for 2 hours. After removal of 1 g of insoluble residue by filtration, the tetrahydrofuran and most of the toluene are distilled off under vacuum (heating bath temperature up to 90° C.). A resin which is soluble in dimethyl sulfoxide is obtained. It still contains considerable proportions of sulfonic acid groups. Isocyanate content: 17.8%, acid content 157.6 milliequivalents per 100 g.

Example 8

The procedure is the same as in Example 7 but the tetrahydrofuran is slowly distilled off at normal pressure in the course of about 4 hours, the reaction temperature rising to 80° C. The last traces of tetrahydrofuran are then removed in a water jet vacuum. The viscosity of the solution rises very sharply during the removal of tetrahydrofuran by distillation, and the mass is finally no longer stirrable. A high molecular weight, slightly cross-linked elastomeric polyisocyanate is obtained. The product is insoluble in organic solvents but dissolves with evolution of carbon dioxide and hydrolysis when heated with water.

What is claimed is:

1. A process for the preparation of modified polyisocyanates which contain sulfonic acid alkyl ester groups and in which the isocyanate groups may be at least partly in the dimerized form, comprising: reacting isocyanatoaryl sulfonic acids having at least two isocyanate groups and wherein the isocyanate groups may be at least partly in the dimerized form, optionally as mixtures with mono and/or polyisocyanates which are free from sulfonic acid groups, with di- and/or tetrahydrofurans at 0° to 190° C., wherein the equivalent ratio of isocyanate groups, including any isocyanate groups present in the dimerized form, to sulfonic acid groups is greater than 1:1 and the equivalent ratio of di- and tetrahydrofuran groups to sulfonic acid groups is from 0.1:1 to 10:1.

2. The process of claim 1, wherein said equivalent ratio of isocyanate groups to sulfonic acid groups is from 1.05:1 to 50:1.

3. The process of claim 2, wherein said equivalent ratio of isocyanate groups to sulfonic acid groups is 2:1 to 30:1.

4. The process of claim 1, wherein said isocyanatoaryl sulfonic acids are reacted with tetrahydrofuran.

5. The process of claim 1, wherein said equivalent ratio of di- or tetrahydrofuran groups to sulfonic acid groups is from 0.6:1 to 5:1.

6. The process of claim 1, wherein said reaction temperature is from 20° to 140° C.

7. The process of claim 1, wherein said isocyanatoaryl sulfonic acids are used in the reaction in the form of solutions in organic phosphates.

8. The process of claim 1, wherein said isocyanatoaryl sulfonic acids in admixture with mono and/or polyisocyanates is the mixture produced by sulfonating aromatic polyisocyanates which are free of sulfonic acid groups.

9. The process of claim 8, wherein said aromatic polyisocyanates which are free of sulfonic acid groups are selected from the group consisting of 2,4-tolylene diisocyanate, 2,6-tolylene diisocyanate, 4,4'-diisocyanatodiphenyl methane, 2,4'-diisocyanatodiphenyl methane, and mixtures thereof.

10. The process of claim 1, characterized in that in a first reaction step, aromatic polyisocyanates which are free from sulfonic acid groups are sulfonated in known manner, and the polyisocyanate mixture which is obtained from this sulfonation and which consists at least partly of isocyanatoaryl sulfonic acids is reacted with said di- or tetrahydrofuran without being first worked up.

11. Polyisocyanate mixtures, comprising:

(a) 4 to 48% by weight of isocyanate groups optionally present in the dimerized form,
(b) 0.3 to 38% by weight of groups of the formula —SO$_2$—O— forming part of an aryl sulfonic acid alkyl ester group.
(c) 0 to 36% by weight of sulfonic acid groups,
(d) 0 to 25% by weight of urethane groups —NH—CO—O—, and
(e) 0 to 28% by weight of allophanate groups

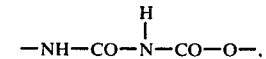

the groups mentioned under (d) and (e) together amounting to at least 0.4% by weight and no more than 28% by weight and the groups mentioned under (b) and (c) together amounting to not more than 38% by weight.

12. The polyisocyanate mixtures of claim 11, wherein said component
(a) is 10 to 40%,
(b) is 0.6 to 28%,
(c) is 0 to 10%,
(d) is 0.2 to 20%, and
(e) is 0.2 to 20%.

13. In a process for the production of urethane groups containing products comprising reacting an isocyanate with an isocyanate receiving group containing compound, the improvement wherein the isocyanate is a polyisocyanate mixture comprising:

(a) 4 to 48% by weight of isocyanate groups optionally present in the dimerized form,
(b) 0.3 to 38% by weight of groups of the formula —SO$_2$—O— forming part of an aryl sulfonic acid alkyl ester group,
(c) 0 to 36% by weight of sulfonic acid groups,
(d) 0 to 25% by weight of urethane groups —NH—CO—O—, and
(e) 0 to 28% by weight of allophanate groups

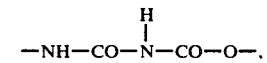

the groups mentioned under (d) and (e) together amounting to at least 0.4% by weight and no more than 28% by weight and the groups mentioned under (b) and (c) together amounting to not more than 38% by weight.

14. The process of claim 13, wherein said component
(a) is 10 to 40%,
(b) is 0.6 to 28%,
(c) is 0 to 10%,
(d) is 0.2 to 20%, and
(e) is 0.2 to 20%.

* * * * *